No. 653,790. Patented July 17, 1900.
W. H. CROOK.
VALVE GEAR FOR STEAM ENGINES.
(Application filed May 26, 1899.)
(No Model.) 3 Sheets—Sheet 1.
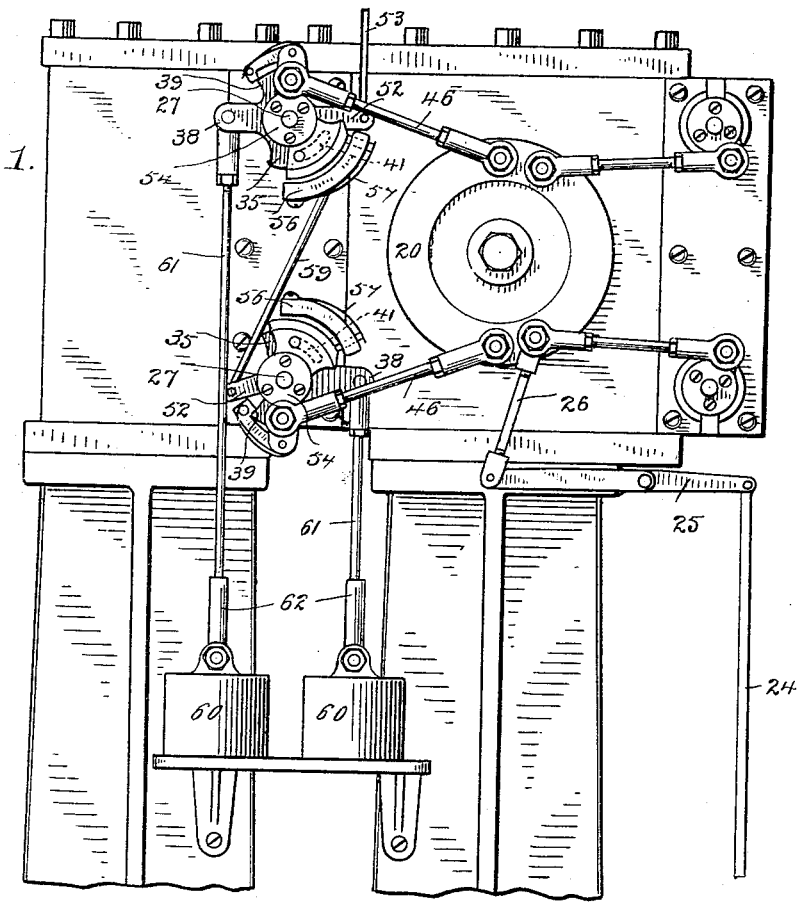
Fig. 1.
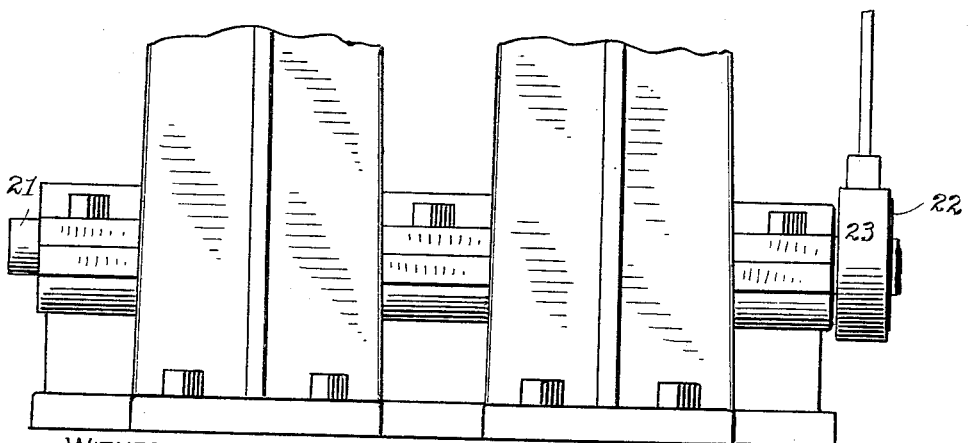
WITNESSES
INVENTOR
William H. Crook
By A. M. Wooster
Atty.

No. 653,790. Patented July 17, 1900.
W. H. CROOK.
VALVE GEAR FOR STEAM ENGINES.
(Application filed May 26, 1899.)

(No Model.) 3 Sheets—Sheet 2.

WITNESSES
H. H. Lamly
N. Elwood

INVENTOR
William H. Crook
By A. M. Wooster
Atty.

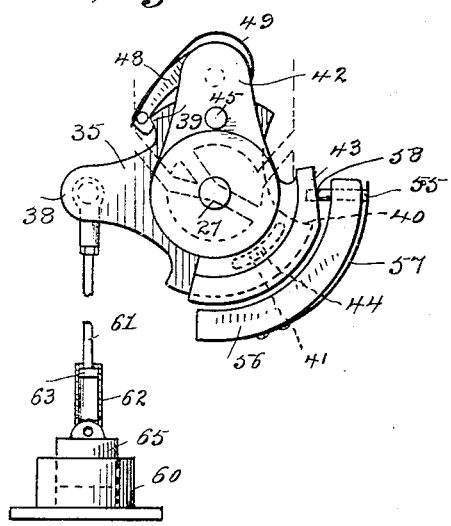
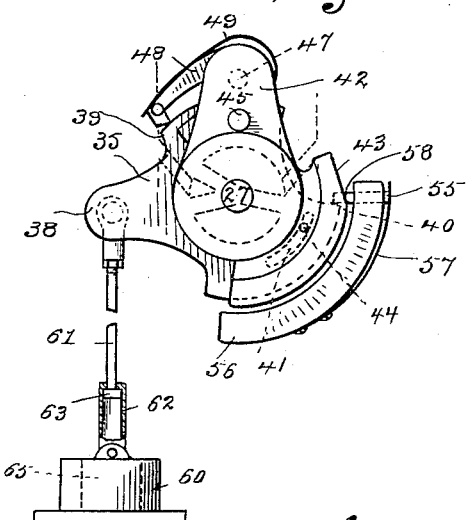
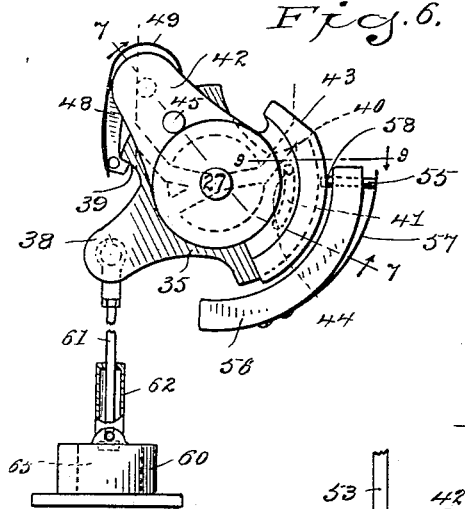
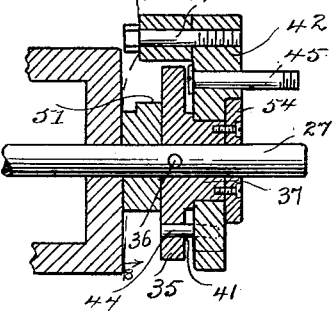
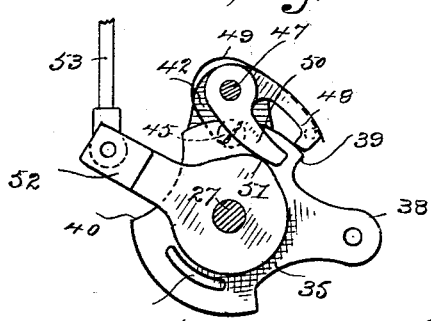
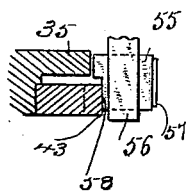

UNITED STATES PATENT OFFICE.

WILLIAM H. CROOK, OF ANSONIA, CONNECTICUT.

VALVE-GEAR FOR STEAM-ENGINES.

SPECIFICATION forming part of Letters Patent No. 653,790, dated July 17, 1900.

Application filed May 26, 1899. Serial No. 718,411. (No model.)

*To all whom it may concern:*

Be it known that I, WILLIAM H. CROOK, a citizen of the United States, residing at Ansonia, county of Fairfield, State of Connecticut, have invented a new and useful Valve-Gear for Steam-Engines, of which the following is a specification.

My invention has for its object to simplify and cheapen the construction and to greatly improve the operation of steam-engines, either stationary or marine and whether adapted to be run at a high speed or low speed. With these ends in view I have devised a novel type of compound engine in which the live-steam chest is placed between the high-pressure and low-pressure cylinders, thereby keeping the walls of both cylinders at practically an equal temperature, a large portion of the heat radiated from the live-steam chest being utilized in keeping the cylinders heated, in which connecting-pipes or a receiver between the high-pressure and low-pressure cylinders is dispensed with, thereby greatly reducing the amount of condensation and loss of power from friction and also reducing the number of valves to four and enabling me to use short direct steam-passages between the live-steam chest and the high-pressure cylinder and between the high-pressure and low-pressure cylinders. This special arrangement of the live-steam chest and cylinders furthermore enables me to economize greatly in space required for the engine and in the cost of construction owing to the reduced number of the parts and their simplicity and also insures constant saving in coal consumption and in the cost of running the engine, as the working parts are not likely to get out of repair and are easy of access.

Figure 2:
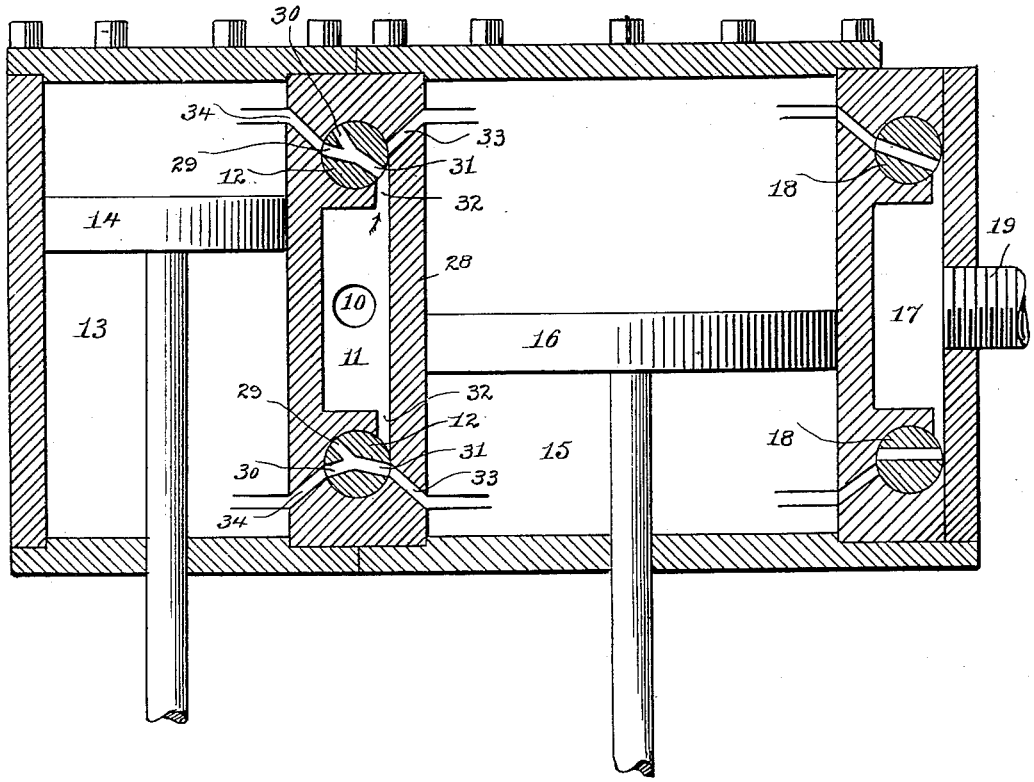
Figure 3:
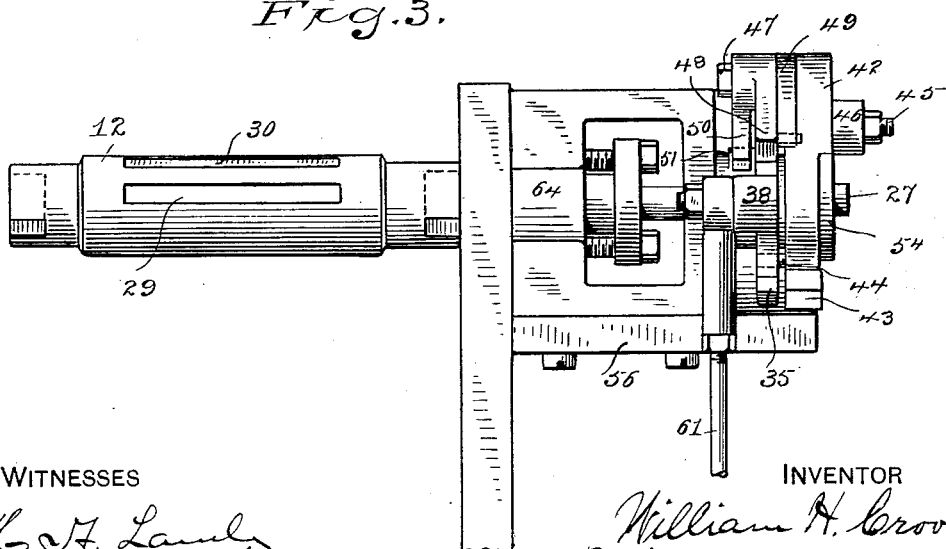

In the accompanying drawings, forming part of this specification, Figure 1 is an elevation illustrating the valve mechanism of my novel engine; Fig. 2, a central section, on an enlarged scale, of the live and exhaust steam chests, the valves, and the high and low pressure cylinders; Fig. 3, an elevation, on an enlarged scale, of one of the valves and the operating mechanism therefor detached; Fig. 4, a detail view showing a position of one of the valves and the corresponding valve-operating mechanism while the high-pressure cylinder is taking steam, the position of said parts corresponding with Figs. 1, 2, and 3; Fig. 5, a similar view showing the position of the parts after steam has been cut off from the high-pressure cylinder; Fig. 6, a similar view, the position of the parts corresponding with the position of the lower valve in Fig. 2—that is, showing a position of one of the valves and the corresponding valve-operating mechanism when steam is passing from the high-pressure cylinder to the low-pressure cylinder; Fig. 7, a section on the line 7 7 in Fig. 6; Fig. 8, a section on the line 8 8 in Fig. 7, the same being a reverse view of the valve-operating plate and the tripping-cam; and Fig. 9 is a detail sectional view on the line 9 9 in Fig. 6.

10 denotes the admission-pipe; 11, the live-steam chest; 12, oscillatory live-steam valves; 13, the high-pressure cylinder; 14, the high-pressure piston; 15, the low-pressure cylinder; 16, the low-pressure piston; 17, the exhaust-steam chest; 18, the exhaust-valve; 19, the exhaust-pipe; 20, the swing-plate; 21, the crank-shaft, and 22 the eccentric.

The oscillations of the swing-plate are controlled from the eccentric in the usual manner.

23 denotes the eccentric-strap, and 24 the eccentric-rod, the other end of which is connected to a lever 25, and 26 denotes a rod one end of which is connected to the swing-plate and the other to lever 25 at the end opposite to the eccentric-rod.

The live-steam valves, which I have indicated by 12, are rigidly secured to valve-stems 27. These valves, which consist simply of cylinders, are socketed in the casting 28, in which the live-steam chest is formed. 64 denotes one of the valve-stem stuffing-boxes. As the two live-steam valves and the corresponding valve mechanisms are identical in structure, I will for convenience use the singular form in the description. Each live-steam valve is provided with two ports 29 and 30, which converge and extend into a port 31. Port 31 is adapted to register either with a passage 32, extending into the live-steam chest, this being the position shown at the top in Fig. 2, or with a passage 33, leading into the low-pressure cylinder, this being the position shown at the bottom in Fig. 2. Port 29 in the valve is adapted to register with a passage 34, leading into the high-pressure cylinder, when port 31 is registering with passage 32, leading into the live-steam chest, as at the top in Fig. 2. In this position of the parts steam is passing from the live-steam chest through passage 32, ports 31 and 29, and passage 34 into the high-pressure cylinder. Port 30 in the valve is adapted to register with passage 34, leading into the high-pressure cylinder, when port 31 is registering with passage 33, leading into the low-pressure cylinder, as at the bottom in Fig. 2. In this position of the parts steam is passing from the high-pressure cylinder through passage 34, ports 30 and 31, and passage 33 into the low-pressure cylinder.

The oscillations of the live-steam valves are controlled from the swing-plate by novel valve-operating mechanism, which I will now describe.

35 (see Fig. 7 in connection with Figs. 4 to 8, inclusive) denotes a member which for convenience I term the "valve-operating plate." This plate is rigidly secured to the valve-stem, as by a pin 36, and comprises a hub 37, a dash-pot arm 38, a shoulder 39, a shoulder 40, and a slot 41, the purposes of which will presently be explained.

42 denotes a member which for convenience I term the "hook-carrying plate." This plate is mounted to oscillate on hub 37 of valve-operating plate 35 and is provided with a cam 43, a pin 44, which engages slot 41 in the valve-operating plate, a pin 45, which receives a rod 46, the other end of which is pivoted to swing-plate 20, and a pin 47, which carries a hook 48, adapted to engage shoulder 39 upon valve-operating plate 35. This hook is held in engagement with the edge of the valve-operating plate, so as to engage shoulder 39 the instant the parts are placed in proper position relatively to each other, by means of a spring 49 and is provided with an arm 50, which is adapted to be engaged by a tripping-cam 51. This cam is pivoted on the valve-stem and is provided with an arm 52, to which governor-rod 53 is pivoted. In use the governor (not shown in the drawings) actuates rod 53 in the usual manner, which in turn oscillates tripping-cam 51 on the valve-stem and either disengages hook 48 from shoulder 39 or permits the engagement of said hook with the shoulder, spring 49, as already stated, acting to keep the hook in engagement with the edge of the valve-operating plate. The operation and functions of these parts will presently be fully explained. Hook-carrying plate 42 is shown as retained in position on hub 37 by means of a disk 54, which is rigidly secured to the end of the hub by screws or in any suitable manner, leaving the hook-carrying plate free to oscillate on the hub.

55 denotes a slide which is adapted to reciprocate in a slot in a bracket 56, which is rigidly secured to the casing of the valve-stem stuffing-box 64. This slide, which is held forward in operative position by a spring 57, is adapted to be engaged by shoulder 40 upon the valve-operating plate when the valve is in the closed position and is provided with a surface 58, which engages the edge of hook-carrying plate 42 and the cam 43, said cam acting to lift the slide out of engagement with shoulder 40 against the power of spring 57 and when the hook-carrying plate is oscillated in the opposite direction permitting the slide to move into position to be engaged by the shoulder again. It will be noticed (see Fig. 1) that the arms 52 of the independent valve-operating mechanisms are connected by a rod 59.

60 denotes the dash-pots, 65 the plungers, and 61 the dash-pot rods, the opposite ends of which are connected to the arms 38 of valve-operating plates 35. The novel feature of this portion of the engine lies in the fact that a cylinder 62 is provided between each dash-pot plunger and the corresponding arm 38 and that the dash-pot rod is provided with a head 63 within the cylinder, said head being adapted to engage the head of the cylinder when arm 38 is swung upward and to move downward into the cylinder when said arm swings downward.

It will of course be understood that pin 44 on the hook-carrying plate and slot 41 in the valve-operating plate may be transposed, if preferred. As such reversal is obviously a mere matter of detail, it is not thought to require illustration.

The operation is as follows: As already stated, the position of the parts in Figs. 1, 2, 3, and 4 is the same. In this position of the parts the swing-plate has been and is traveling from left to right and the high-pressure piston is making the downstroke, the movement of the swing-plate toward the right having commenced at the instant the high-pressure piston started on the downstroke. Steam is now passing from the live-steam chest directly through the upper live-steam valve and into the high-pressure cylinder. Valve-operating plate 35, and with it the valve, has been placed in the position shown by the engagement of hook 48, carried by plate 42, with shoulder 39 on the valve-operating plate and the oscillation of plate 42 having been produced by the swing-plate and rod 46. Simultaneously with the opening of the valve the plunger of the dash-pot has been drawn up to its raised position. It will of course be understood that while the high-pressure piston is moving downward steam is passing from before the high-pressure piston through the lower live-steam valve into the low-pressure cylinder and is forcing the low-pressure piston upward, steam from above the low-pressure piston passing through the upper exhaust-valve into the exhaust-steam chest. As the high-pressure piston continues its downstroke the swing-plate is moved a little farther to the right and moves hook-carrying plate 42 with it by means of rod 46. Turning now to Fig. 5, which is an intermediate position, it will be noticed that hook 48 has been disengaged from valve-operating plate 35, that the valve has been closed by the dash-pot, and that shoulder 40 on the valve-operating plate is in contact with slide 55. The pull of the dash-pot, which is now closed, holds the valve-operating plate in contact with slide 55 until the piston has finished its downstroke. As the piston finishes its downstroke and passes the bottom center to commence its upstroke the swing-plate commences to oscillate from right to left, as it appears in Fig. 1. The disengagement of hook 48 from the valve-operating plate is effected by means of tripping-cam 51, which engages arm 50 of said hook. This disengagement of the hook, and the consequent closing of the valve, is controlled entirely by the governor (not shown) through rod 53, the oscillation of tripping-cam 51 either toward the right or the left by means of the governor giving either an earlier or a later release of the valve, and consequent cut-off of the steam. In the present instance the cut-off is shown as taking place in the first half of the stroke. If the governor was above speed through lightness of load upon the engine or from any cause, the tripping of hook 48, and the consequent cutting off of the steam, would take place at the very commencement of the stroke, the steam acting expansively during the remainder of the stroke, or if the governor was below speed from increase of load or from any cause whatever the release of hook 48 from the valve-operating plate, and the consequent closing of the valve and cutting off the steam, might not take place at all, live steam following the high-pressure piston the full stroke. It will of course be apparent that it will be easy to so adjust the parts, when it is desired to run the engine at a very high speed, that hook 48 will not be disengaged from the valve-operating plate and there will be no cut-off of the steam, the steam following the full stroke of the piston constantly. Returning now to the swing-plate, the movement of this plate from right to left carries with it plate 42. As the movement continues cam 43 on said plate through its engagement with surface 58 upon slide 55 lifts said slide out of engagement with shoulder 40 on the valve-operating plate. At the same instant pin 44 engages the end of slot 41 in the valve-operating plate and moves said plate also from right to left, which enables hook 48 to again engage shoulder 39 upon the valve-operating plate, as clearly shown in Fig. 6. When the high-pressure piston reaches the end of its upstroke and passes the top center to commence the downstroke, the swing-plate commences to oscillate from left to right again and by means of rod 46, plate 42, and hook 48 swings the valve-operating plate and valve from the position shown in Fig. 6 to the position shown in Figs. 1, 2, 3, and 4.

Having thus described my invention, I claim—

1. The combination with a valve 12 and a valve-stem carrying a valve-operating plate 35, of a plate 42 adapted to oscillate on the valve-stem and carrying a hook adapted to engage the valve-operating plate, and a slide 55 adapted to be engaged by the valve-operating plate when the valve is fully closed.

2. The combination with a valve 12 and a valve-stem carrying a valve-operating plate 35, of a plate 42 adapted to oscillate on the valve-stem and having a cam 43 and carrying a pivoted hook adapted to engage the valve-operating plate, bracket 56 and a slide 55 adapted to reciprocate in a slot in said bracket and to be engaged by the valve-operating plate when the valve is fully closed, said slide having a surface 58 adapted to be engaged by cam 43 whereby the slide is disengaged from the valve-operating plate.

3. The combination with a valve 12, a valve-stem carrying a valve-operating plate 35 and the swing-plate, of plate 42 adapted to oscillate on the valve-stem and carrying a hook adapted to engage the valve-operating plate, and a cam 43, slide 55 adapted to engage the valve-operating plate and having a surface adapted to be engaged by the cam and a rod connecting plate 42 and the swing-plate.

4. The combination with a valve 12 and a valve-stem carrying a valve-operating plate 35 having a slot 41, of a plate 42 adapted to oscillate on the valve-stem, said plate having a cam 43, a pin 44 adapted to engage the slot and a hook adapted to engage the valve-operating plate, and a slide 55 adapted to be engaged by the valve-operating plate when the valve is fully closed and to be disengaged by the cam the next oscillation of the plate.

5. The combination with a valve 12 and a valve-stem carrying a valve-operating plate 35 having a slot 41 and shoulders 39 and 40, of a plate 42 adapted to oscillate on the valve-stem, said plate having a cam 43, a pin 44 adapted to engage the slot and a pivoted hook adapted to engage shoulder 39 and a slide 55 adapted to be engaged by shoulder 40 when the valve is fully closed and to be disengaged by cam 43.

6. The combination with a valve-operating plate having shoulders 39 and 40 and a slot 41, of oscillating plate 42 having a cam 43, a pin adapted to engage slot 41 for the purpose set forth and a pivoted hook adapted to engage shoulder 39, a slide 55 adapted to be engaged by shoulder 40 when the valve is in the open position and to be disengaged by the cam, means for disengaging the hook from shoulder 39 and a dash-pot connected with the valve-operating plate for closing the valve.

7. The combination with a valve-operating plate having shoulders 39 and 40 and a slot 41, of oscillating plate 42 having a cam 43, a pin adapted to engage the slot and a pivoted hook adapted to engage shoulder 39, a slide 55 adapted to be engaged by shoulder 40 and to be disengaged by the cam, means for disengaging the hook from shoulder 39 and a dash-pot comprising a plunger, a cylinder 62 and a rod connected to the valve-operating plate and having a head 63 within the cylinder, the valve being moved to the open position by the engagement of the hook with the valve-operating plate and said movement being stopped by the engagement of the valve-operating plate with the slide and said valve after the disengagement of the hook being closed by the dash-pot and the valve-operating plate returned to position to be again engaged by the hook by the engagement of the pin with the slot, head 63 moving downward freely in cylinder 62.

8. The combination with a valve 12, a valve-stem carrying a valve-operating plate 35 and the swing-plate, of plate 42 adapted to oscillate on the valve-stem and carrying a hook adapted to engage the valve-operating plate and a cam 43, bracket 56, slide 55 adapted to reciprocate in a slot in said bracket and a spring adapted to hold said slide in engagement with cam 43 and the edge of plate 42.

In testimony whereof I affix my signature in presence of two witnesses.

WILLIAM H. CROOK.

Witnesses:
DENIS F. WALSH,
F. L. GAYLORD.